United States Patent [19]

Hanaway et al.

[11] 4,362,005

[45] Dec. 7, 1982

[54] TENSIONING MECHANISM FOR FEEDER CONVEYOR POSITIONED WITHIN FEEDER HOUSING

[75] Inventors: Roger D. Hanaway, Blue Springs, Mo.; Larry R. James, Olathe, Kans.; Garry W. Busboom, Independence, Mo.

[73] Assignee: Allis-Chalmers Corporation, Milwaukee, Wis.

[21] Appl. No.: 283,974

[22] Filed: Jul. 16, 1981

[51] Int. Cl.³ .............. A01D 41/06; B65G 23/44; A01D 57/20

[52] U.S. Cl. .................. 56/14.6; 198/814; 56/DIG. 15

[58] Field of Search ............ 56/10.2, 14.6, DIG. 15; 130/27 AB; 198/814; 474/117

[56] References Cited

U.S. PATENT DOCUMENTS

| 1,299,701 | 4/1919 | Gilman et al. | 198/814 |
|---|---|---|---|
| 1,634,187 | 6/1927 | Hartvikson | 198/814 |
| 2,302,656 | 11/1942 | Dray | 198/814 |
| 2,312,838 | 3/1943 | Johnston | 56/14.6 X |
| 2,612,988 | 10/1952 | Andrews | 198/814 |
| 3,521,433 | 7/1970 | Wright et al. | 56/11.9 |
| 3,537,243 | 11/1970 | Bichel | 56/14.6 |
| 3,804,231 | 4/1974 | Maiste | 198/728 |
| 3,854,572 | 12/1974 | Maiste | 198/814 |
| 3,990,802 | 11/1976 | Corona | 464/184 X |
| 4,253,343 | 3/1981 | Black et al. | 198/814 X |

Primary Examiner—Robert P. Swiatek
Attorney, Agent, or Firm—Charles L. Schwab

[57] ABSTRACT

A pair of tensioning mechanisms (56, 57) for an idler drum (47) of a conveyor (28) transferring crop material from the header (21) to the processor (31) of a harvester are located entirely within the conveyor housing (22). Each tensioning mechanism (56, 57) includes an arm (66 or 67) secured by a combined pivot and lost motion connection (88, 91, 93, 96 or 89, 92, 94, 97) to the conveyor housing side walls (41, 42) and biased by a tension spring (104 or 106) disposed at its inboard side.

5 Claims, 5 Drawing Figures

TENSIONING MECHANISM FOR FEEDER CONVEYOR POSITIONED WITHIN FEEDER HOUSING

CROSS-REFERENCE TO RELATED PATENT APPLICATION

The structure disclosed in this patent application is similar to that disclosed in copending patent application of Roger D. Hanaway and Larry R. James for Feeder Idler Drum Shaft with Removable Extensions Ser. No. 283,975, filed July 16, 1981.

TECHNICAL FIELD OF THE INVENTION

This invention relates to a tensioning mechanism for the idler roller of a feeder chain of an agricultural harvester.

BACKGROUND OF PRIOR ART

Harvester endless belt conveyors with floating idler rollers having belt tensioning mechanisms using compression springs disposed outside the conveyor housing side walls are show in U.S. Pat. Nos. 3,854,572; 3,804,231; and 2,302,656. U.S. Pat. Nos. 3,521,433 and 3,537,243 each show a pair of arms within an endless belt conveyor housing for supporting a conveyor idler roller for limited vertical swinging movement about a transverse horizontal axis. In these last-mentioned patents, the tensioning of the endless belt conveyor is effected in part by screw adjusters on the outside of the conveyor housing which are connected to pivot pins for the arms, which pivot pins extend through longitudinal slots in the side walls of the conveyor housing. Compression spring-type tensioning mechanisms for harvester conveyor idlers positioned on the laterally inner sides of the conveyor side walls are shown in U.S. Pat. No. 1,634,187 and 2,612,988.

BRIEF SUMMARY OF THE INVENTION

The present invention is particularly useful in a harvester having an elongated endless chain conveyor disposed between a pair of vertical side walls of a housing and wherein an idler at one end of the conveyor is rotatably carried on a shaft having a transverse horizontal axis. Opposite ends of the idler shaft are connected to first corresponding ends of a pair of arms within the housing adjacent laterally inner sides of the side walls. Second corresponding ends of the idler support arms are connected to the side walls by lost motion pivot connections permitting vertical swinging movement of the arms and relative movement between the arms and the side walls in the longitudinal direction of the conveyor. A pair of tension springs are disposed within the housing with first corresponding ends connected to the arms and second corresponding ends connected to the housing side walls. Locating the conveyor tensioning mechanism on the inside of the conveyor housing side walls reduces clutter on the outside of the harvester and makes space available for other operating mechanisms.

The use of tension-type springs in the belt tensioning mechanisms eliminates the need for guide rods or the like to maintain the shape of the spring. The lost motion connection between the arms and the conveyor side walls is also the pivot connection therebetween permitting vertical swinging movement of the idler end of the conveyor.

BRIEF DESCRIPTION OF THE DRAWINGS

The invention is illustrated in the drawings in which:

FIG. 4 is a view taken along the line IV—IV in FIG. 1; and

FIG. 5 is a view taken along the line V—V in FIG. 3.

DETAILED DESCRIPTION OF THE INVENTION

Figure 1:
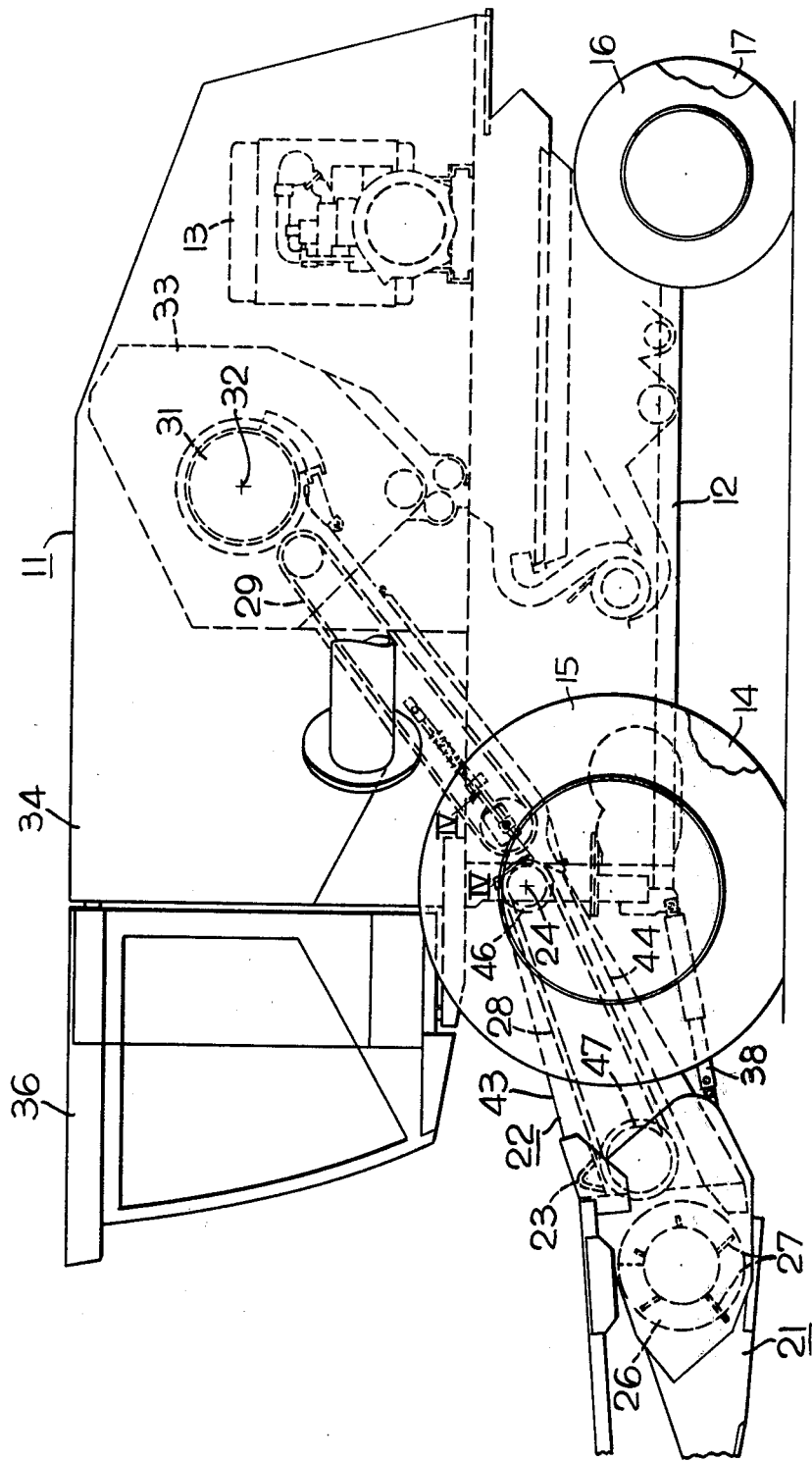
FIG. 1 is a side view of an agricultural combine.

Referring to FIG. 1, the combine 11 incorporating the present invention includes a main frame 12 on which an engine 13 is mounted for powering the combine and driving a pair of front wheels 14, 15 through a drive train (not shown). The rear of the main frame 12 is supported by a pair of rear steerable wheels 16, 17. A detachable crop header 21 is releasably secured to a feeder housing 22 as by a hook joint 23 and the rear end of the feeder housing is pivotally mounted to the main frame 12 on a transverse pivot axis 24. The crop material entering the header 21 is conveyed by oppositely flighted sections of a transverse auger 26 to a central portion thereof where retractable fingers 27 move the material rearwardly to a feeder conveyor 28 within the feeder housing 22. A second or rear endless belt conveyor 29 accepts material from the front feeder conveyor 28 and feeds it rearwardly to an axial flow combine processor 31 mounted on a transverse axis 32 within a processing chamber 33 at the rear of a grain tank 34. An operator's enclosure or station 36 is mounted at the front of the grain tank 34 in a position overlying the feeder housing 22. The header 21 is raised and lowered about transverse axis 24 by a pair of laterally spaced hydraulic actuators 38, only one of which is shown, disposed between the combine main frame 12 and the feeder housing 22.

Figure 2:
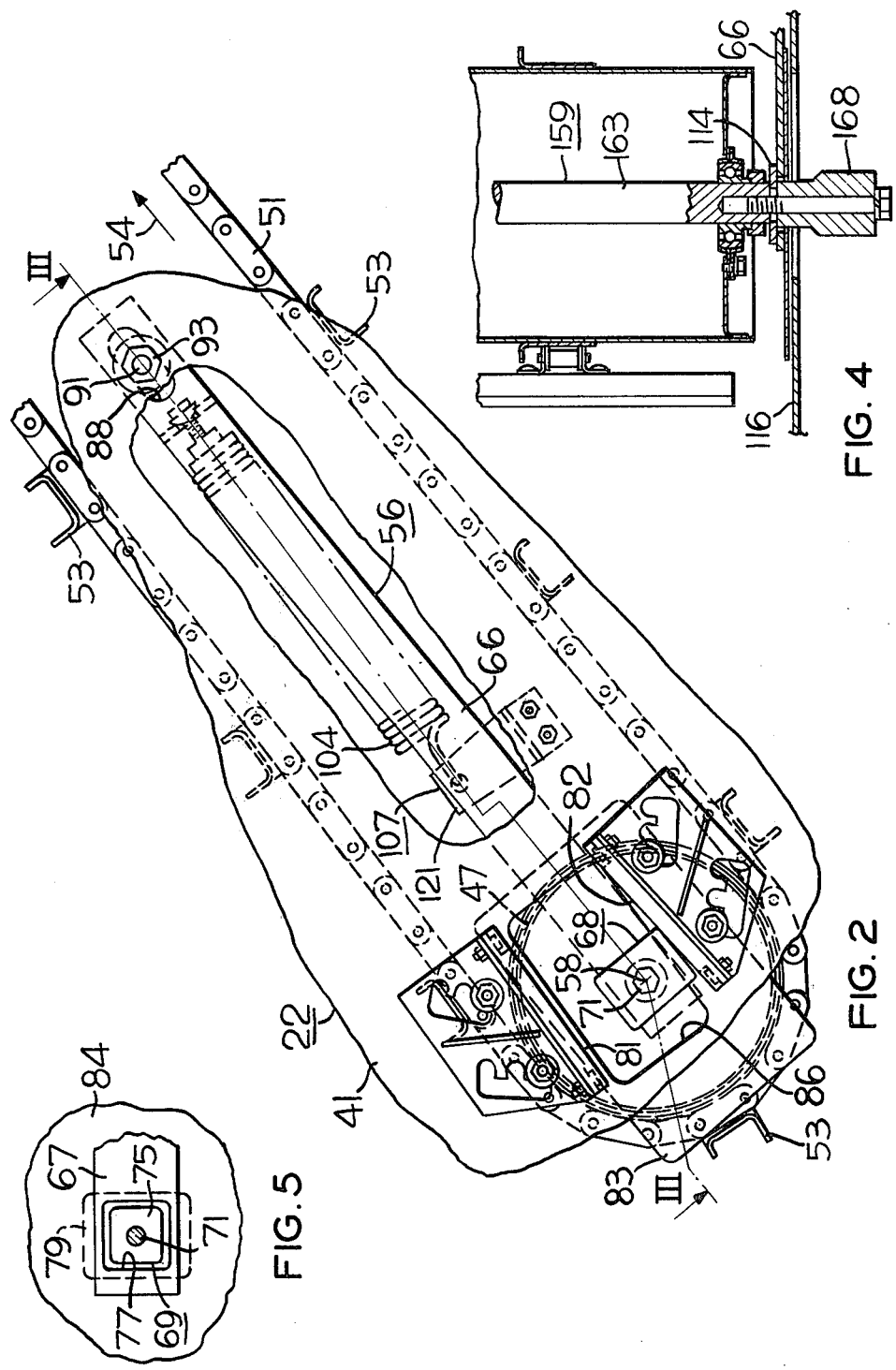
FIG. 2 is an enlarged side view of a portion of the feeder conveyor with parts broken to show parts of a tensioning mechanism.
Figure 3:
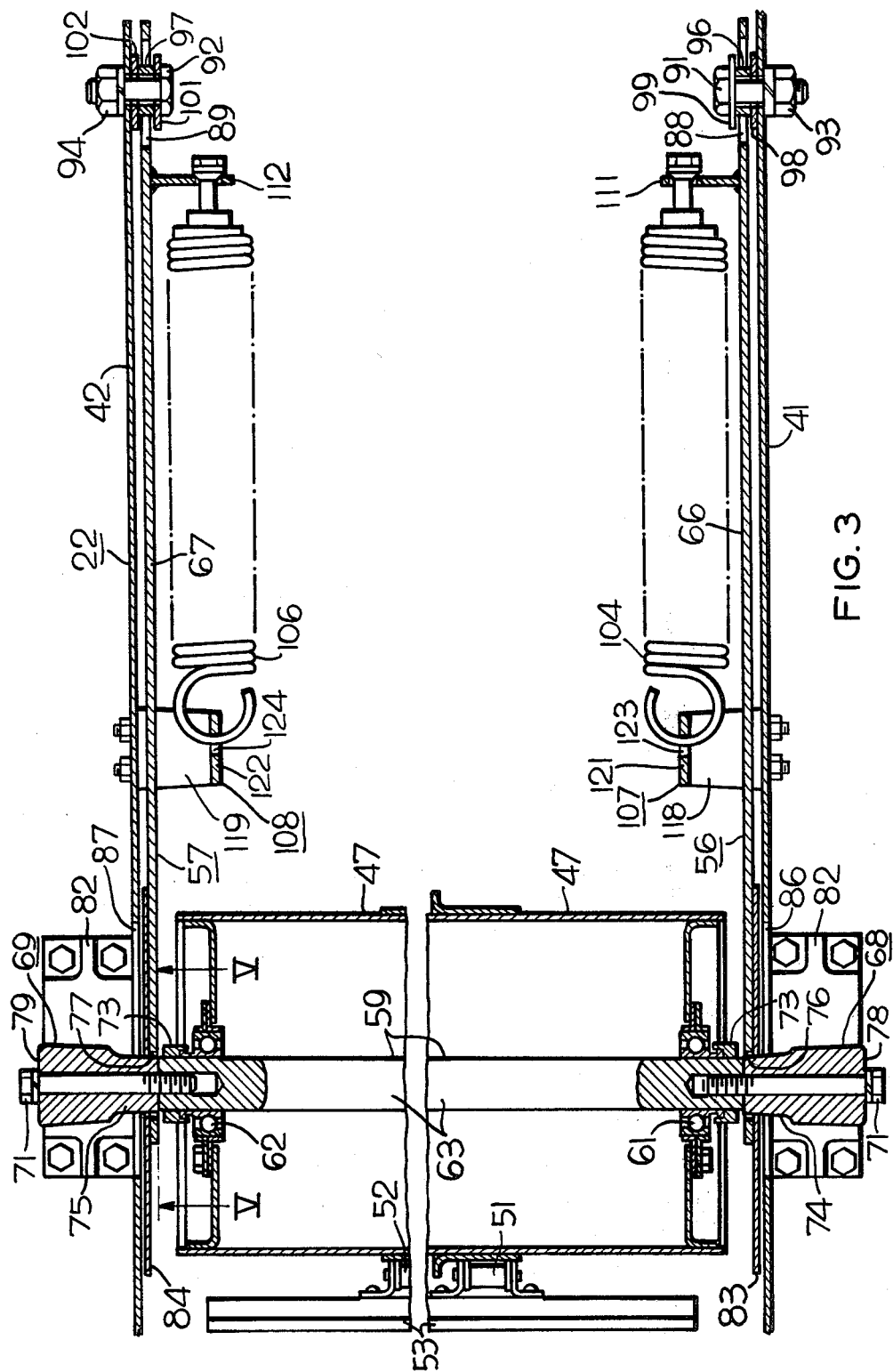
FIG. 3 is an enlarged view taken along the line III—III in FIG. 2.

Referring to FIGS. 1, 2 and 3, the feeder housing 22 includes a pair of laterally spaced side walls 41, 42 and top and bottom walls 43, 44. Mounted within the feeder housing 22 are an upper drive shaft 46 rotating on pivot axis 24 and a lower floating idler or idler drum 47. The upper drive shaft 46 is driven by the engine 13 through a drive train, not shown. The endless belt feeder conveyor 28 is of the chain belt-type and includes conveyor chains 51, 52 carried by the shaft 46 and the drum 47. A series of transverse slats 53 are attached to the chains 51, 52 which move in the direction of arrow 54 to convey crop material. The idler drum 47 is floatingly mounted relative the side walls 41, 42 of the feeder housing 22 by a pair of shaft supporting tensioning mechanisms 56, 57 which are opposite images of one another. The idler drum 47 is rotatably mounted on a transverse axis 58 by a nonrotating shaft 59. The drum is rotatably supported by a pair of anti-friction bearings 61, 62 on the laterally opposite ends of a main or central shaft portion 63. The central portion 63 of the shaft 59 also carries a pair of retainers 73 for the idler drum support bearings 61, 62.

The central shaft portion 63 terminates at its opposite ends within the lateral space between the side walls 41, 42 of the feeder housing 22 and within the lateral spacing of a pair of tensioning support arms 66, 67 of the tensioning mechanism 56, 57. A pair of axial extensions 68, 69 are mounted on laterally opposite ends of the central portion 63 of the shaft 59 by cap screws 71. As shown in FIGS. 3 and 5, the inboard parts 74, 75 of the extensions 68, 69 extend through openings 76, 77 in the free ends of the support arms 66, 67 and outboard parts 78, 79 of the arms 66, 67 are in vertically confronting abuttable relation to upper and lower stops 81, 82 adjustably positioned on the outboard sides of the side walls 41, 42 of the feeder housing 22. The shaft extensions 68, 69 at their inboard ends extend through aligned openings in a pair of dust shields 83, 84 interposed between the arms 66, 67 and the side walls 41, 42 of the feeder housing. The dust shields 83, 84 are in covering relation to a pair of relatively large openings 86, 87 in the side walls 41, 42. The openings 86, 87 permit the ends 68, 69 of the idler shaft 59 to move vertically in response to movement of the forward end of the conveyor 28 as varying loads are encountered and also permits the idler shaft to move longitudinally under the influence of the tensioning mechanisms 56, 57 as for instance when wear occurs in the feeder chains 51, 52.

The tensioning and mounting arms 66, 67 have slots 88, 89 at their upper rear ends which are elongated in the longitudinal direction of the endless belt feeder conveyor 28. This insures the idler being biased by the springs of the tensioning mechanism. The shaft supporting arms 66, 67 are pivotally and shiftably mounted on the side walls 41, 42 of the feeder housing by pivot means in the form of pivot bolts 91, 92 secured by nuts 93, 94 and carrying cylindrical spacers or bushings 96, 97 between washers 98, 99, 101, 102. The bushings 96, 97 pivotally mount the arms 66, 67 through their cooperative engagement with the surfaces defining the slots 88, 89 in the arms. Thus, the pivot bushings 96, 97 and slots provided a combined pivot and lost motion connection. The arms 66, 67 are resiliently urged forwardly to tension the conveyor chains 51, 52 by a pair of tension springs 104, 106 which have front corresponding ends connected to L-shaped brackets 107, 108 bolted to the side walls 41, 42 and rear corresponding ends connected to brackets 111, 112 welded to the rear parts of the shaft support arms 66, 67.

The transverse legs 118, 119 of the L-shaped brackets 107, 108 are spaced vertically from the arms 56, 57 a sufficient distance to permit the arms to swing vertically between the stops 81, 82 in their most widely spaced position of adjustment and the vertical legs 121, 122 of the brackets 107, 108 are spaced laterally inwardly from the inside of the walls 41, 42 so that the tension springs may be hooked through openings 123, 124 therein whereby the springs lie adjacent the inboard sides of and in substantial horizontal alignment with the arms 66, 67.

The tensioning mechanisms for the rear endless belt conveyor 29 are similar to the tensioning mechanisms 56, 57 for the front feeder conveyor except for use of washers or spacers 114 between a central portion 163 and the end extensions 168 of the idler shaft 159. The washers 114 are used because the side walls, only wall 116 of which is shown, adjacent the rear conveyor 29 are of slightly wider spacing than the side walls 41, 42. The washers 114 also serve to maintain a minimum lateral spacing between the arms 66, 67 of the rear conveyor tensioning mechanisms.

The embodiments of the invention in which an exclusive property or privilege is claimed are defined as follows:

1. A harvester having an elongated endless belt conveyor disposed between a pair of vertical side walls of a housing characterized by
   an idler drum carrying one end of said conveyor,
   a shaft rotatably carrying said drum on a first horizontal axis transverse to said side walls,
   a pair of arms within said housing adjacent laterally inner sides of said side walls and extending toward the opposite end of said conveyor, said arms having first corresponding ends connected to laterally opposite end portions of said shaft within said housing,
   a pair of pivot connections between second corresponding ends of said arms and said side walls permitting vertical swinging movement of said arms about a second transverse horizontal pivot axis, said pivot connections including cooperating pivot parts on said arms and side walls permitting relative movement between said arms and side walls in the longitudinal direction of said conveyor, and
   a pair of tension springs within said housing having first corresponding ends connected to said arms and second corresponding ends connected to said side walls, said springs acting in tension to bias said arms in the longitudinal direction toward said idler drum to operatively tension said conveyor.

2. The harvester of claim 1 wherein said pivot connections each include a slot elongated in the direction of elongation of said conveyor and a cylindrical pivot element extending through and in cooperative engagement with the surfaces defining said slot.

3. The harvester of claim 2 wherein said slots are in said second corresponding ends of said arms and said cylindrical pivot elements are secured to said side walls.

4. The harvester of claim 1 wherein said tension springs lie adjacent the inboard side of and in substantial horizontal alignment with said arms.

5. The harvester of claims 1, 2, 3 or 4 wherein said side walls present openings through which the opposite end portions of said shaft extend and further comprising upper and lower stop means on the laterally outer side of each side wall operable to limit up and down swinging movement of said arms about said second axis.

* * * * *